United States Patent [19]

Gustafson

[11] 4,122,718

[45] Oct. 31, 1978

[54] LIQUID LEVEL SENSOR

[76] Inventor: Reuben V. Gustafson, 228 W. 17th St., New York, N.Y. 10011

[21] Appl. No.: 790,823

[22] Filed: Apr. 25, 1977

Related U.S. Application Data

[63] Continuation-in-part of Ser. No. 596,511, Jul. 16, 1975, abandoned.

[51] Int. Cl.² .............................................. G01F 23/26
[52] U.S. Cl. .................................................. 73/304 C
[58] Field of Search ..................... 73/304 C; 324/61 P

[56] References Cited

U.S. PATENT DOCUMENTS

| | | | |
|---|---|---|---|
| 3,175,527 | 3/1965 | Deaner | 324/61 P |
| 3,343,415 | 9/1967 | Johnston | 73/304 C |
| 3,638,491 | 2/1972 | Hart | 73/304 C |
| 3,958,159 | 5/1976 | Rauchwerger | 73/304 C X |

FOREIGN PATENT DOCUMENTS

| | | | |
|---|---|---|---|
| 1,150,123 | 1/1958 | France | 73/304 C |
| 925,656 | 5/1963 | United Kingdom | 324/61 P |

*Primary Examiner*—Jerry W. Myracle
*Attorney, Agent, or Firm*—Kenyon & Kenyon, Reilly, Carr & Chapin

[57] ABSTRACT

A pair of wires are encased in a non-absorbing corrosive-resistant material such as Teflon and disposed vertically inside a tank or the like with the wires brought out to a capacitive sensing device to provide a liquid level sensor operable in almost any liquid and some dry granular materials.

17 Claims, 9 Drawing Figures

LIQUID LEVEL SENSOR

RELATED APPLICATIONS

This application is a continuation in part of application Ser. No. 596,511 filed July 16, 1975, now abandoned.

BACKGROUND OF THE INVENTION

This invention relates to the measuring and sensing of liquid levels in general and more particularly to an improved apparatus for measuring and detecting liquid levels.

Liquid level sensors presently in use typically comprise a metal rod coated with an insulating coating such as Teflon, forming one electrode of a capacitor with a tank wall forming the second capacitor electrode. By applying an RF signal across the two capacitor leads with an appropriate RF oscillator it is possible to detect and amplify changes in capacitance to provide an output indicative of liquid level or to provide an alarm if the liquid level exceeds a predetermined limit.

In another similar type of device an insulated wire is centrally located inside a metal pipe and the pipe and wire inserted into the tank, the pipe serving as one electrode for the capacitor and the wire as the other. Such an arrangement permits use in tanks where the tank is not made of metal which can act as a capacitor plate. For example, certain tanks are made of fiberglass. In instances where the materials stored in the tank are of a corrosive nature, the rod or wire is normally coated with Teflon.

These arrangements suffer from various disadvantages. The first mentioned arrangement using a rod, can only be used in tanks which are made of a conductive material. Otherwise, additional capacitive elements must be provided. Furthermore, the use of a solid rod causes difficulty in inserting the probe into certain types of tanks or devices where a clear vertical path is not present for insertion purposes. The same problem exists with a metal pipe containing a central wire electrode. This latter arrangement, whether the central electrode be a wire or a rod, has further problems in that when used with sticky materials a build up in the pipe occurs which results in inaccurate output indications.

Also of interest is a detecting apparatus disclosed in British patent specification No. 925,656. In particular, in the arrangement shown on FIGS. 3 and 4, two wires are encased in insulating material with a thin web therebetween. A similar arrangement for detecting leads is disclosed in applicant's prior U.S. Pat. No. 3,824,460. In that arrangement, the encased conductors lie on the floor and contain cutouts to improve their sensitivity to the change of dielectric constant which occurs when a liquid fills the gap between conductors. However, a direct implementation of the teachings contained in the aforementioned British specification and of the teachings in applicant's prior patent does not lead to a practical device. Applicant in attempting to come up with an improved liquid level sensor attempted to employ wires coated in a plastic material such as PVC. In testing such a device it is discovered that the results were not repeatable. Furthermore, problems were encountered in achieving adequate resolution and in using the device in tanks containing corrosives and tanks having a large degree of turbulence. It thus became evident that an improved device of this nature was needed.

SUMMARY OF THE INVENTION

The present invention provides such a device. Essentially, the sensor comprises a pair of encased wires with the casing made of Teflon or an equivalent material. It was the applicant's discovery that the lack of repeatability in devices made using wires coated with PVC, for example, was due to an absorption of water or other moisture by the plastic material. In addition, when used with corrosive materials the plastic was attacked. Because of this, the results were not repeatable over a long period of time. The probe of the present invention is formed from a strip of a fluoroplastic, such as polytetrafluoroethylene [sold under the "Trademark Teflon" by Dupont] or modified ETFE [such as "Tefzel" sold by Dupont], material or other corrosion resistant, nonabsorbent material such as polyethylene, containing a pair of parallel wires spaced equidistantly therein with the strip sealed closed at the terminating end of the probe. This can be done by bending back the end and carrying out a heat sealing process. Depending on the particular application, other ways of doing this such as covering the end with an epoxy material may be used.

A preferred way of sealing the end is to use a boot of the same material and heat seal it to the end of the probe. This avoids inaccuracies which result from the extra wire length which is present when bending back the end.

As is well known in the art, polyethylene is resistant to corrosives and has a water absorption of less than 0.01% in 24 hr., $\frac{1}{8}$ in. thick. Similarly, Teflon is not affected by corrosives and has a water absorption of 0.00%. Modified ETFE has a water absorption of 0.029%. This last material, although having a higher water absorption, is sufficient for purposes of the present invention and tests have shown that it is easier to handle in making the parallel wires encased therein. Generally, any of the fluoroplastics may be used and in general terms, if the material has water absorption of not more than approximately 0.03%, it will meet the requirements of the present invention.

Although Teflon coating on capacitance elements has been used previously, it was used for a different purpose, i.e., it was used for adding corrosion resistance to single elements. It has not been previously recognized that through the use of Teflon or similar encased accurately-spaced parallel wires a stable capacitive probe capable of measuring liquid levels even in deep wells or the like could be constructed. In vessels of sticky liquids, the Teflon-embodied parallel wires give great improvement over the metal pipe with Teflon-covered wire in the center, for example, or two separate Teflon-covered rods.

In accordance with a further embodiment of the present invention, improved resolution is obtained by having a plurality of wires coupled in series running over the full vertical length of the tank. This may be accomplished by running the wires in the encased Teflon strip up and down a number of times or may be accomplished by encasing more than two wires in a strip of Teflon, for example.

To overcome problems associated with turbulant tanks, the sensor of the present invention can be installed within a tube made of plastic such as Teflon or the like and containing a vent hole or holes in the upper end.

Because of the flexibility of the sensor of the present invention, it can be installed in areas where difficulty is encountered when installing pipes, rods or the like. Furthermore, its simplicity of construction permits ease of tailoring to each separate application. It is simply necessary to cut off a strip of the proper length and seal the end of that strip.

Another form of the present invention in which single coated wires, the wires being coated with the same type of material as referred to above, are disposed within a tube made of plastic such as PVC is also disclosed.

BRIEF DESCRIPTION OF THE DRAWINGS

FIG. 2 is a perspective view of the sensor of the present invention.

DETAILED DESCRIPTION OF THE PREFERRED EMBODIMENT

Figure 1:
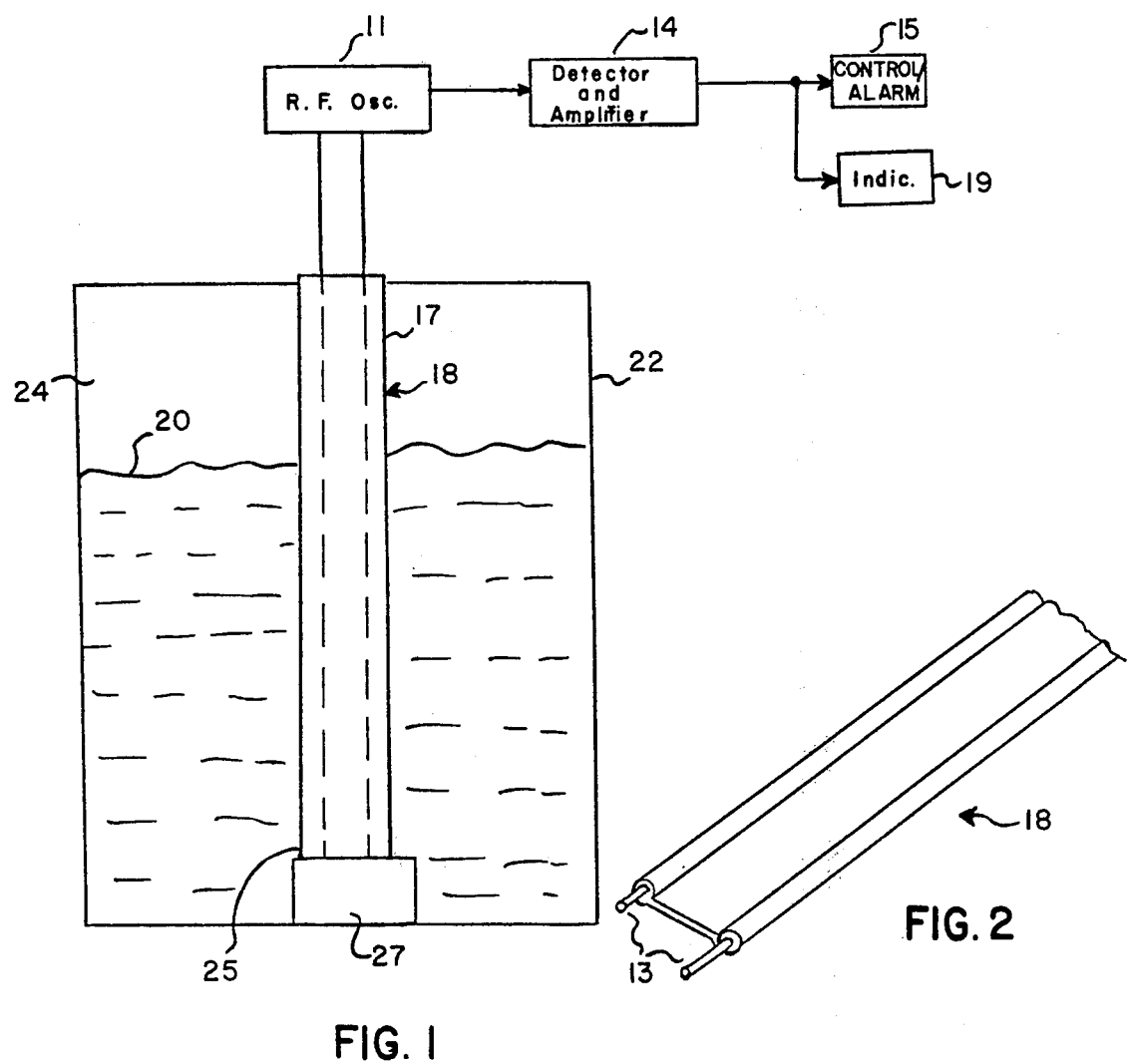
FIG. 1 is a block diagram illustrating the sensor of the present invention installed in tank.

FIG. 1 illustrates in schematic form the sensing system of the present invention. An RF oscillator 11 has an output which is provided into a circuit including the capacitor formed by the encased spaced wires 13. The capacitance between the wires 13 will be equal to:

$$C = KA/d,$$

where:
K = the dielectric constant;
A = the wire area; and
D = the distance between the wires.

Thus, the capacitance is a direct function of the dielectric constant K of the material between the two wires. The dependance of the capacitor formed by wires 13 will be equal to:

$$X_C = 2fc,$$

where
$f$ = frequency
As capacitance changes, the impedance and the current flow through the capacitor is changed. Thus, as water or other liquid lies alongside the sensor, designated generally as 18, the dielectric constant between the two wires 13 will change and with it the capacitance. This in turn causes a change in the current flowing through the capacitor which is detected by detector 14 and amplified. The detector can provide an output to an indicator 19 such as a voltmeter callibrated to give a reading of the level 20 in tank 22 in which the probe 18 is installed. In addition, an alarm or control 15 can be provided, preset to output a signal if the level 20 exceeds a predetermined level 24, for example. The circuits of blocks 11, 14, 15 are conventional circuits and can be obtained, for example, from Amiprodux, Inc. of New York.

The structure of the sensing probe of the present invention is shown in the perspective view of FIG. 2. The two wires 13 are enclosed with a material of low water absorption such as a fluoroplastic, such as Teflon or Tefzel, for example, with a web of material 17 providing the spacing between the wires. Spacing is not of particular importance for probes of short length. It will be recognized that depending on the depth or the liquid level 20 in tank 22, a greater or lesser portion of the probe 18 will have the higher dielectric constant of water between the wires than will the portion above the liquid which is surrounded by air. (Water has a dielectric constant of 81 as compared to air having a dielectric constant of 1, thus resulting in a significant difference in capacitance.) As a result, the current detected by detector 14 will vary essentially linearly depending on the depth of the water or other liquid in tank 22.

Figure 3:
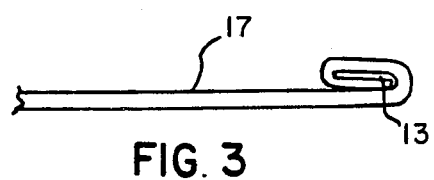
FIG. 3 is an elevation view showing a manner in which the end of the sensor of FIG. 2 can be bent over for heat sealing.
Figure 3A:
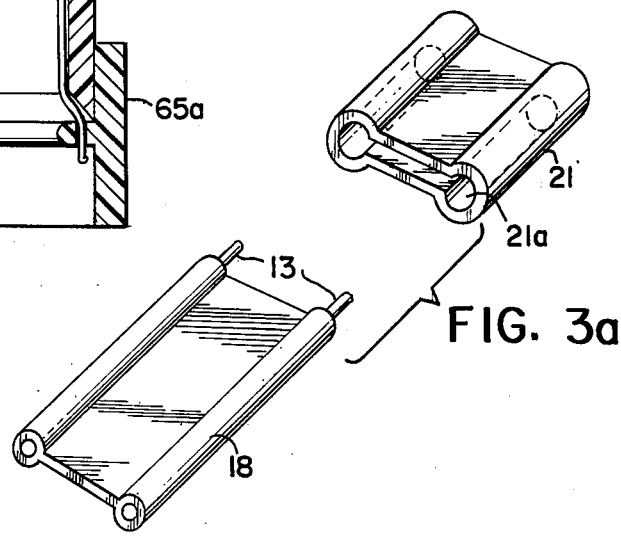
FIG. 3a illustrates another manner of sealing the end of the sensor.

It is of course necessary that the termination ends of the wires, i.e., the wires at end 25 of the sensor probe 18, be insulated to prevent a current flow through the liquid. The sensor material 18 will normally be made up in long strips with a strip cut to the length necessary for a particular application. The manner of insulating the ends is illustrated on FIG. 3. The cut end with the exposed conductors 13 can be bent over as shown and then the end heat-sealed at a temperature which will melt the material used to cause the insulating material to completely cover the ends. FIG. 3a shows another way of sealing the end of probe 18. A boot 21 having a recess 21a sized to fit the probe 18 and made of the same material is slipped over the end of the probe and the end then heat sealed. In this way, parallel conductor lengths at the end of the probe, which will lead to some inaccuracy, is avoided.

Shown also in the tank of FIG. 1 is a weight 27 for maintaining sensor 18 vertical. Depending on the tank construction and other factors, the weight may be replaced with a suitable hook or the like on the bottom of the tank.

Figure 4:
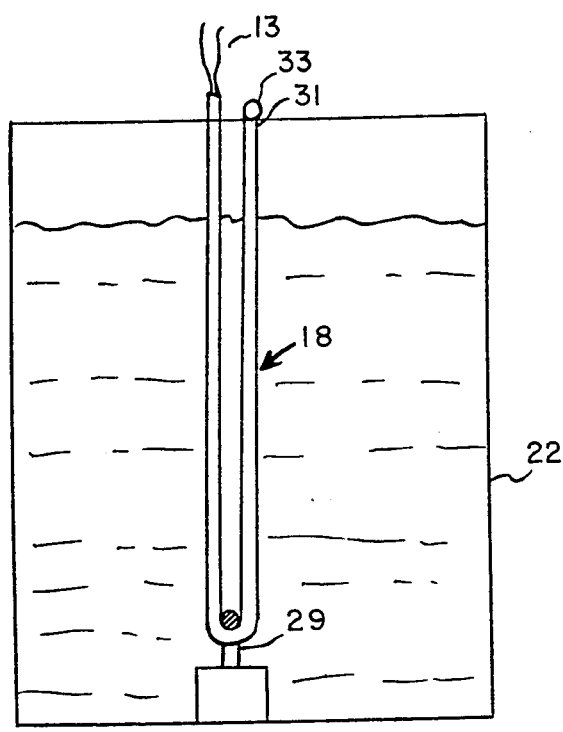
FIG. 4 is a cross-sectional view of a first embodiment for improving resolution.

An alternate embodiment of the present invention is illustrated on FIG. 4. Here, the sensor 18 is brought down to the bottom of the tank and then looped around a suitable hook or rod 29 which is weighted or secured in some other manner at the bottom of the tank and brought up again and the terminating end 31 of the sensor 18 attached to a hook or rod or the like 33 mounted at the top of the tank 22. In accordance with the equation given above, i.e., the equation for capacitance, the wire area available is doubled. It is doubled for each particular liquid, thus doubling the capacitance for any given level. Thus, a system which otherwise could only resolve one foot change in depth through an arrangement such as this can now resolve a half foot in depth. If further resolution were desired, the looping could be continued to give 3, 4, or more lengths of the sensor 18 for the height of the tank 22.

Figure 5:
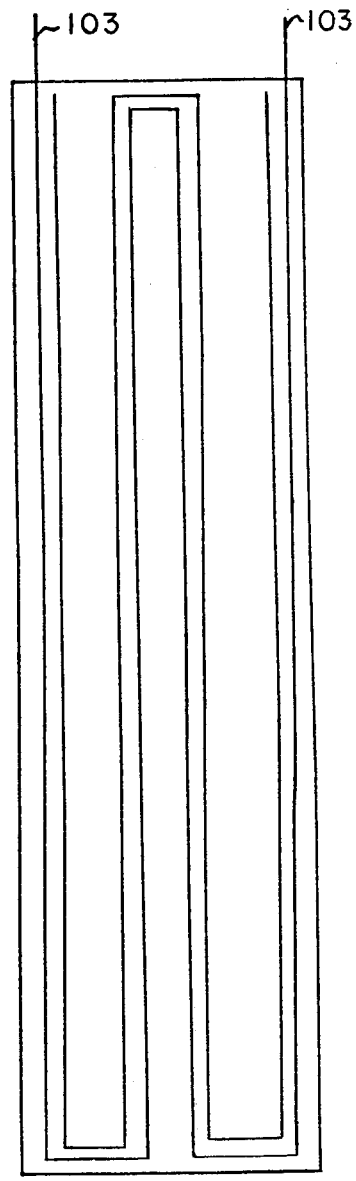
FIG. 5 is a similar view of an alternate embodiment for improving resolution.

The effect can also be achieved by arranging the wires inside a casing of material of low water absorption in the manner illustrated on FIG. 5. However, as is evident, this leads away from using a universal probe sensor material for all applications and requires making up a special probe for a given tank depth. It does, however, avoid the problems of running the sensor up and down in the tank. In this case, each of the wires 103 and 104 is caused to run up and down a number of times to get the increase in length, and thus increase the area and capacitance of the sensor.

Figure 6:
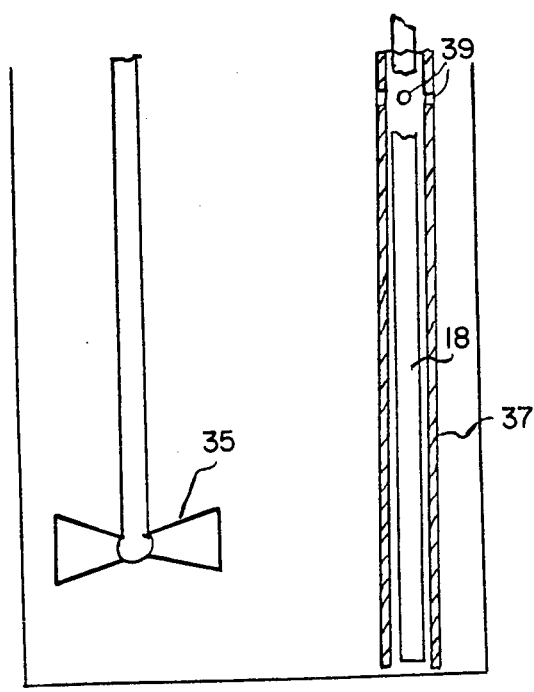
FIG. 6 is a cross-sectional view showing a further embodiment of the present invention in which the sensor is encased in tube, containing vent holes at the upper end, to permit operation in a turbulant environment.

A further embodiment of the invention is illustrated by FIG. 6. Here an installation for use in a tank in which turbulence results due to the action of the agitator 35 is illustrated. In such an installation, the sensor 18 is encased within a pipe or tube 37 containing a vent hole or holes 39 at the upper end. The tube will be of a plastic material or the like dictated by the particular application. Preferably, at least the inside of the pipe or tube 37 will be coated with Teflon, or other material of low water absorption, thereby preventing materials from sticking to either the side of the tube or the coated sensor. Furthermore, the tube 37 can be made semi-rigid so that it can flex to be introduced into a tank if the path over which it must be introduced is not directly from the top, i.e., if it must be inserted through a bend in the side or some similar arrangement.

Figure 7:
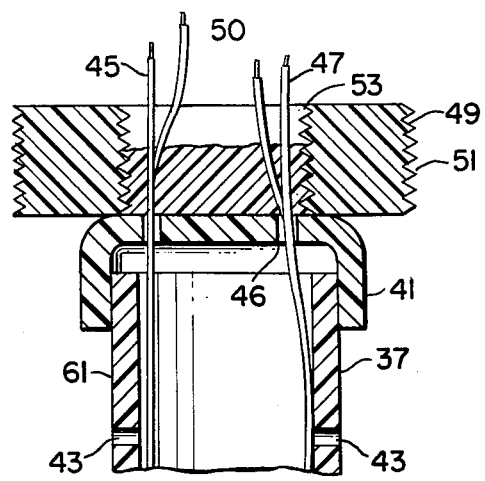
FIG. 7 is an embodiment of the present invention using a plastic tube containing single wires which are insulated with a material of low water absorption, and showing the manner of attachment which can be used also with the embodiment of FIG. 6.

FIG. 7 illustrates both the manner in which an adequate connection can be made to the tube 37 and also illustrates an alternate embodiment of the present invention using single conductors encased in a suitable material. Considering first the manner of attachment to the top of the tube, it will be recognized that a tight connection is desirable so that the wires can be taken out of the tube and brought into an appropriate terminal board from which they can be coupled to the sensor. The arrangement shown on FIG. 7 permits this. Over the top of the tube 37 a tube end cap 41 is provided. The tube, for example, may be typical PVC piping which is commercially available. It can contain a plurality of holes 43 to permit access of the material to be measured. In the embodiment shown, single pairs of wires 45 and 47 are utilized. However, the end connection is equally applicable to the embodiment of FIG. 6. The end cap 41 is attached to the end of the tube 37 in conventional fashion such as by means of a solvent weld. Appropriate holes 46 are formed therein to permit the wires 45 and 47 to pass therethrough. In the case of an embodiment such as that of FIG. 6, the opening would be of a nature to permit passage of the twin leaded cable 18. Alternatively, the same type of opening shown could be used with the web portion in the middle, i.e., the portion between the two conductors 13, partially stripped away where the conductors pass through the end cap 41. In any case, conductors such as the conductors 45 and 47 or the dual conductor 18, will be brought through the end cap. Attached to the end cap is an adapter 49 having on its outside threads 51 and on its inside threads 53. Typically the inside will be one inch NPT and the outside 2 or 3 inches, similarly NPT. The wires are brought through the central opening 50 in the member 49, the member having been solvent welded on to the cap 41 whereupon a plastic filler 53 is filled to act as a vapor lock to seal over the top of the cap 41 were the openings are formed and to cause the wires 45 and 47 to be embedded therein. Thereafter, a coupling device containing a terminal board can be screwed into the remaining portion of the threads 53 and the wires 45 and 47 connected.

Figure 8:
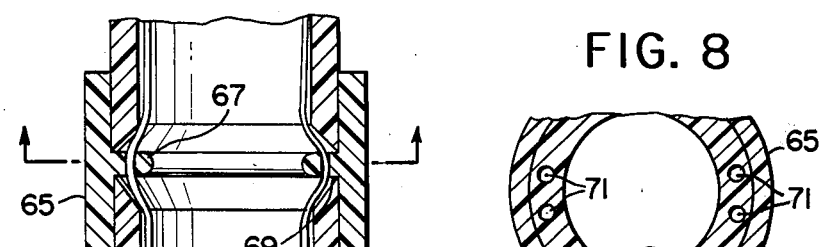
FIG. 8 is a cross section through plastic couplings in FIG. 7.

In the illustrated embodiment the overall pipe 37 is made up of a plurality of sections such as 61 and 63 joined with conventional connecting pieces 65, the joints being formed by solvent welding. Typically when using PVC pipe, the pipe ends of a section such as 61 and 63 butt up against an internal flange 67 in the coupling member 65. The ends are normally square. However, in accordance with the present invention the ends 69 of the pipe sections 61 and 63 are tapered to more or less come to a point where they butt up against the flange 67. This permits holes to be drilled in the flange. These holes 71 are more clearly shown on FIG. 8 which is a cross section through the coupling member 65. The wires are then threaded through these holes. For example, the wire 45 is threaded down through one of the holes 71 in the coupling member 65. It continues in this fashion for as many sections of the pipe as are being used depending on the depth of the tank in which measurement is to take place. At the bottom, an additional connecting memeber 65a is installed at which point the conductor 45 is looped up through the second hole and continues up through the second hole in the coupling member 65 and finally up through the opening 45 in the end cap and out through the central opening 50 in the adapter 49. The taper of the ends of the pipe sections 61 and 63 along with the flange 67 in which the holes are drilled thus providing a convenient manner of retaining the wires 45 and 47 in place and permitting capacitance measurements between the wire 45 and 47 on opposite sides of the tube 37.

Should a coupler without an internal flange be used, a ring containing the necessary holes may be placed inside the coupler to, in effect, form a flange suitable for the purposes of the present invention.

Thus, an improved capacitance sensor for measuring the depth of liquids in tanks, deep wells and the like has been shown. Although specific embodiments have been illustrated and described, it will be obvious to those skilled in the art that various modifications can be made without departing from the spirit of the invention which is intended solely by the appended claims. Also, for example, the apparatus in FIGS. 1 and 5 of the present invention may be used with some flowing granular materials such as small polyethylene beads. In addition, it should be noted that arrangements generally like that of FIG. 1, but having a relatively short sensor wire 18, are used as on-off controls, for example, to detect when a tank has been filled to a predetermined level. The probe 18 of FIG. 2 is equally applicable for such uses.

I claim:

1. A capacitive sensing probe for sensing the depth of liquid in a tank or the like comprising a flat flexible cable made of first and second parallel wires having a constant spacing of at least one half inch encased in modified ETFE fluoroplastic, with the one end of the cable sealed off so that the wires at said end are insulated from each other, the wires extending out of the cable at the other end; and capacitive sensing means coupled to the wires extending from said one end.

2. A probe according to claim 1 wherein said cable is sealed by a boot placed over the end thereof and heat sealed to said cable.

3. The sensing probe of claim 1 and further including means for maintaining said cable vertical within a tank or the like.

4. The sensing probe of claim 3 wherein said means for maintaining said probe vertical comprise a weight attached to the end of said probe.

5. A capacitive sensing probe for sensing the depth of liquid or the like comprising:
   (a) a flat flexible cable;

(b) a capacitive sensing probe for sensing the depth of liquid in a tank or the like comprising a flat flexible cable made of first and second parallel wires having a constant spacing of at least one-half inch encased in a corrosion-resistant material having a water absorbence no more than approximately 0.03% with the one end of the cable sealed off so that the wires at said end are insulated from each other, the wires extending out of the cable at the other end;

(c) a tube made of a material which is at least semi-rigid and containing a plurality of holes therein surrounding said probe;

(d) an end cap on the top of said tube secured thereon, said end cap having an opening therein through which the other end of said cable passes;

(e) an adaptor, having an internal threaded opening therein and having external threads, attached to the top of said end cap, said other end of said cable passing through the opening therein;;

(f) a plastic filler material disposed in said opening and partially filling said opening and sealing around said probe at the top of said cap so as to make a vapor-tight connection, the wires of said cable extending at said other end out through said plastic filler material; and (g) capacitive sensing means coupled to said wires at said other end, whereby said tube will protect said cable in a turbulent environment and whereby the connecting means may be screwed into the internal threads of said adaptor and said adaptor may be screwed into an appropriate thread on a tank or the like.

6. Appparatus according to claim 5 wherein said tube is made of a semi-rigid material.

7. Apparatus according to claim 5 wherein said tube contains a coating of polytetrafluoroethylene on its inside.

8. A capacitive sensing probe for sensing the depth of liquid in a tank or the like comprising a flat cable made of first and second parallel spaced wires encased in a corrosion-resistant non-absorbent material, the length of each wire in said probe being at least twice as great as the maximum depth of liquid to be measured by said probe, each wire extending over the length of said cable at least twice with the wires maintained in parallel relationship, one end of said cable sealed off so that the wires at said one end are insulated from each other, the wires extending out of the cable at the other end; and capacitive sensing means coupled to the wires extending from said other end.

9. The probe of claim 8 wherein said corrosion-resistant non-absorbent material is modified ETFE.

10. A capacitive sensing probe for sensing the depth of a liquid in a tank or the like comprising a flat cable having a length which is at least twice the maximum the depth of liquid to be measured, said cable made of first and second parallel spaced wires encased in a corrosion-resistant non-absorbent material with one end of the cable sealed off so that the wires at said end are insulated from each other, the wires extending out of the cable at the other end; means to cause said probe to extend vertically over the maximum depth to be measured at least twice; and capacitive sensing means coupled to the wires extending from said other end.

11. The probe of claim 10 wherein said corrosion-resistant non-absorbent material is modified ETFE.

12. Apparatus for sealing the end of a tube containing a capacitive sensing probe comprising:

(a) an end cap on the top of said tube secured thereto, said end cap having an opening therein for passage of said probe therethrough; and (b) an adapter having an internal threaded opening therein and having external threads attached to the top of said end cap, said probe passing through the central opening therein; and (c) a plastic filler material disposed in said opening and partially filling said opening and sealing around said probe at the top of said cap so as to make a vapor tight connection whereby connecting means may be screwed into the internal threads of said adapter and whereby said adapter may be screwed into an appropriate thread on a tank or the like.

13. Capacitive sensing probe apparatus comprising:

(a) an elongated tube comprising:
 (1) a plurality of tube sections;
 (2) a plurality of couplers attaching adjacent tube sections, said couplers containing a central internal flange against which the ends of said sections abut;
 (3) an additional coupler at the end of said tube the last section abutting against the flange therein;
 (4) each tube section end abutting against a flange having an internal taper at its end so that said flange is exposed where said section abuts; and
 (5) diametrically opposed holes formed in said flanges; and (b) a probe in the form of at leaast two wires encased in a corrosion-resistant material having a water absorbence no more than approximately 0.03% each extending from the top of said tube to said additional coupler said two wires running on opposite sides of said tube and passing through said holes in said coupler.

14. Apparatus according to claim 13 wherein two diametrically opposed sets of two holes are formed in each flange and wherein each wire is led to said additional coupler through one hole of each set of holes and back to the top of said probe through the other hole of each set of holes.

15. Apparatus according to claim 13 wherein said tube contains a coating of polytetrafluoroethylene on its inside.

16. Apparatus according to claim 13 and further incuding:

(a) an end cap on the top of said tube secured thereto, said end cap having an opening therein for passage of said probe therethrough; and (b) an adapter having an internal threaded opening therein and having external threads attached to the top of said end cap, said probe passing through the central opening therein; and (c) a plastic filler material disposed in said opening and partially filling said opening and sealing around said probe at the top of said cap so as to make a vapor tight connection whereby connecting means may be screwed into the internal threads of said adapter and whereby said adapter may be screwed into an appropriate thread on a tank or the like.

17. A capacitive sensing probe for sensing the depth of liquid or the like comprising:

(a) a flat flexible cable;

(b) a capacitive sensing probe for sensing the depth of liquid in a tank or the like comprising a flat flexible cable made of first and second parallel wires having a constant spacing of at least one-half inch encased in a corrosion-resistant material having a water absorbence no more than approximately 0.03% with the one end of the cable sealed off so that the wires at said end are insulated from each other, the wires extending out of the cable at the other end; and (c) a tube made of a material which is at least semi-rigid and containing a plurality of holes therein surrounding said probe, said tube containing a coating of polytetrafluoroethylene on its inside, whereby said probe can be protected in a turbulent environment.

* * * * *